United States Patent [19]

Paduano et al.

[11] Patent Number: 4,779,883
[45] Date of Patent: Oct. 25, 1988

[54] WHEELCHAIR INFANT CARRIER ACCESSORY

[76] Inventors: Rocco S. Paduano; Salvatore A. Paduano, both of 43 Oakledge Dr., E. Northport, N.Y. 11731

[21] Appl. No.: 77,661

[22] Filed: Jul. 24, 1987

[51] Int. Cl.$^4$ .............................................. A62J 11/00
[52] U.S. Cl. ......................... 280/289 WC; 297/149; 297/251; 297/DIG. 4
[58] Field of Search ................ 280/289 WC; 297/232, 297/250, 251, 377, 149, 148, 150, 151, 152, DIG. 4

[56] References Cited

U.S. PATENT DOCUMENTS

| | | | |
|---|---|---|---|
| 628,306 | 7/1899 | Farrington | 297/152 |
| 2,532,556 | 12/1950 | Keough | 297/150 |
| 2,560,458 | 7/1951 | Long et al. | 297/251 UX |
| 3,795,927 | 3/1974 | Darwin | 297/250 X |
| 4,580,803 | 4/1986 | Davis | 280/289 WC |
| 4,657,269 | 4/1987 | Elvin | 297/232 |

Primary Examiner—John A. Pekar
Attorney, Agent, or Firm—Richard L. Miller

[57] ABSTRACT

This device is designed to fasten an infant car seat to the arms of a wheelchair. Primarily, it consists of a pair of rails that slide onto the arms of the wheelchair, and bars secured to the rails are provided with clamps that engage with and hold the rod portions of the seat safely to the bars.

3 Claims, 1 Drawing Sheet

U.S. Patent
Oct. 25, 1988
4,779,883
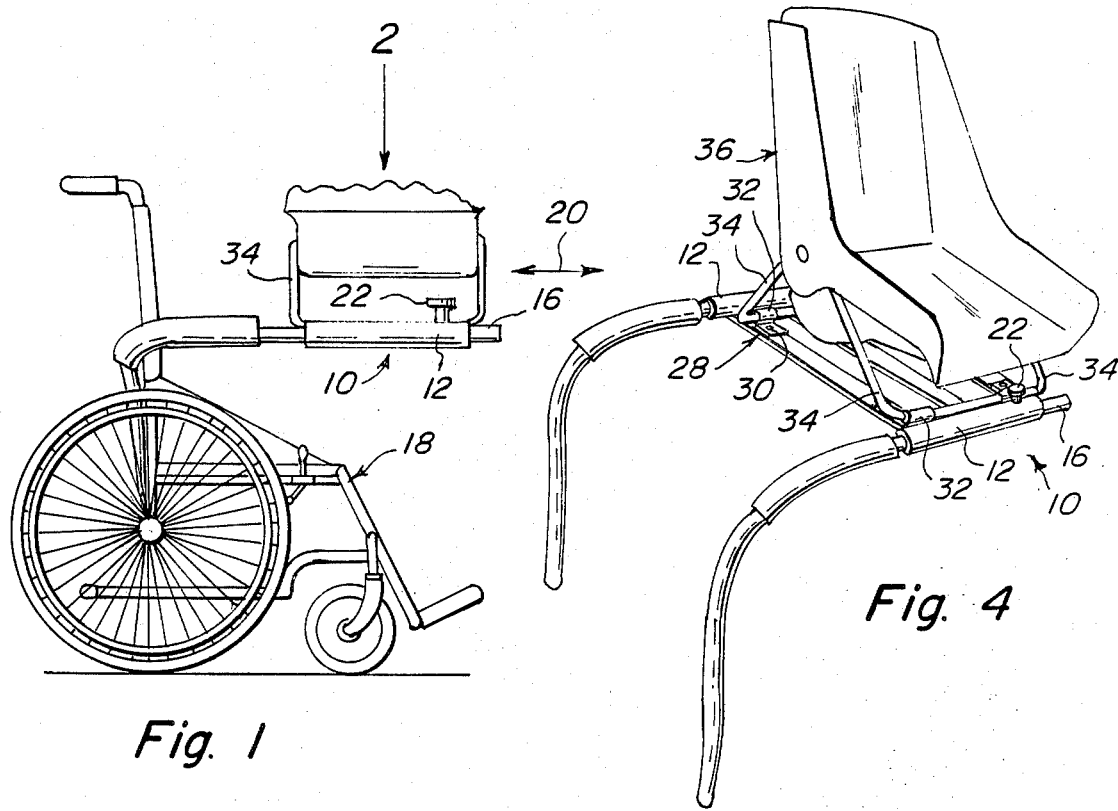
Fig. 1
Fig. 4
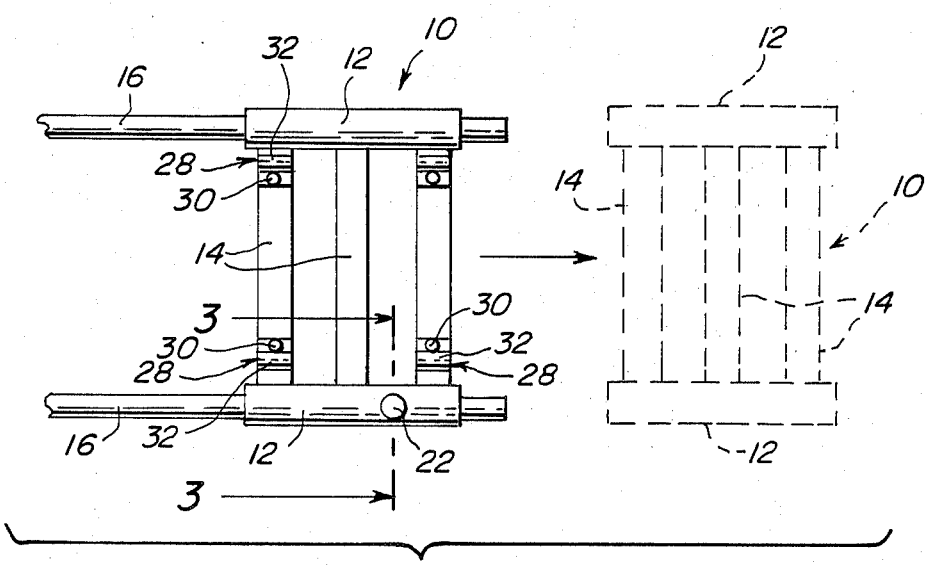
Fig. 2
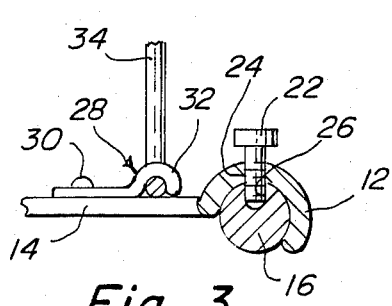
Fig. 3

WHEELCHAIR INFANT CARRIER ACCESSORY

BACKGROUND OF THE INVENTION

The instant invention relates generally to devices for wheelchairs, and more particularly, to a wheelchair infant carrier accessory.

Numerous devices have been provided in the prior art that are adapted to fit onto wheelchairs for convenience to a user. For example, U.S. Pat. Nos. 4,158,428 of Bates, 4,403,786 of Ulics, and 4,580,803 of Davis, all are illustrative of such prior art. While these units may be suitable for the particular purpose to which they address, they would not be as suitable for the purpose of the present invention as hereafter described.

SUMMARY OF THE INVENTION

A primary object of the present invention is to provide a wheelchair infant carrier accessory that will overcome the shortcomings of the prior art devices.

Another object is to provide a wheelchair infant carrier accessory that will be of such design, as to attach a car seat or infant carrier to a wheelchair, enabling a user to still have control of the chair while transporting a child safely.

An additional object is to provide a wheelchair infant carrier accessory that will virtually fit any wheelchair and can be fitted with many different car seats, and the seat portion may be removed easily when desired.

A further object is to provide a wheelchair infant carrier accessory that is simple and easy to use.

A still further object is to provide a wheelchair infant carrier accessory that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a side view of the invention slidably mounted on the arms of a wheelchair;

FIG. 2 is a top view taken in the direction of a arrow 2 in FIG. 1 with parts broken away showing the invention mounted on the arms of the chair, and in phantom removed therefrom;

FIG. 3 is an enlarged cross sectional view taken along line 3—3 in FIG. 2 showing the clamping mechanism which secures the instant invention to the chair arms; and FIG. 4 is an enlarged perspective view of the invention per se before installation on a wheelchair.

DETAILED DESCRIPTION OF THE PREFERRED EMBODIMENTS

Turning now descriptively to the drawings, in which like reference characters denote like elements throughout the several views, a device 10 is shown to include a pair of rails 12 having three spaced bars 14 welded to a longitudinal edge thereof. Rails 12 are slideably received on the arms 16 mounted on wheelchair 18, as indicated by the arrow 20 in FIG. 1, and at least one set screw 22 is freely received in an opening 24 of one rail 12 and is threaded into a threaded opening 26 provided in at least one one arm 16 of wheelchair 18, so as to render device 10 secure to arms 16.

A clamp 28 is secured near each end of the outermost bars 14 by fasteners 30, and the hook portions 32 of the clamps 28 engages with and holds down rod portions 34 of a infant car seat 36.

In use, the rails 12 are aligned with the ends of the wheelchair arms 16 and then the rails are slid onto the arms 16 until the set screw 22 is able to thread into the opening 26 of arm 16. After the above, a child may be safely seated in seat 36.

In operative use the user may roll his/her wheelchair 18 up to a table (not shown) of such a height as to allow the infant car seat 36 to be slid from the arms 16 directly on to the table top or in the alternative to be retrieved from the table top as desired by the user without disturbing the infant residing in the car seat.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An infant car seat device for a wheelchair, comprising, a pair of rails, for being slideably received on arms mounted on said wheelchair, a plurality of bars fixedly secured between said rails for supporting rod portions of an infant car seat, clamps secured to said bars, for holding said infant car seat to said bars, and screw means received in said device, for firmly holding said device to said arms mounted on said wheelchair.

2. An infant car seat device as set forth in claim 1, wherein ends of said bars are fixedly secured to a longitudinal edge of said rails and said rails are slideably received on said arms mounted on said wheelchair, and wherein said screw means is a set screw freely received in an opening provided in one rail of said pair of rails and is threadingly received in a threaded opening provided in one arm and securely holds said device to said arms.

3. An infant car seat device as set forth in claim 2, wherein said clamps are secured to a face of a pair of said bars by fasteners, and hook portions of said clamps engage with rod portions of an infant car seat and firmly hold said infant car seat to said pair of said bars.

* * * * *